July 20, 1937.  D. F. GREEN  2,087,474
COVER FOR MEAT GRINDERS
Filed June 25, 1936
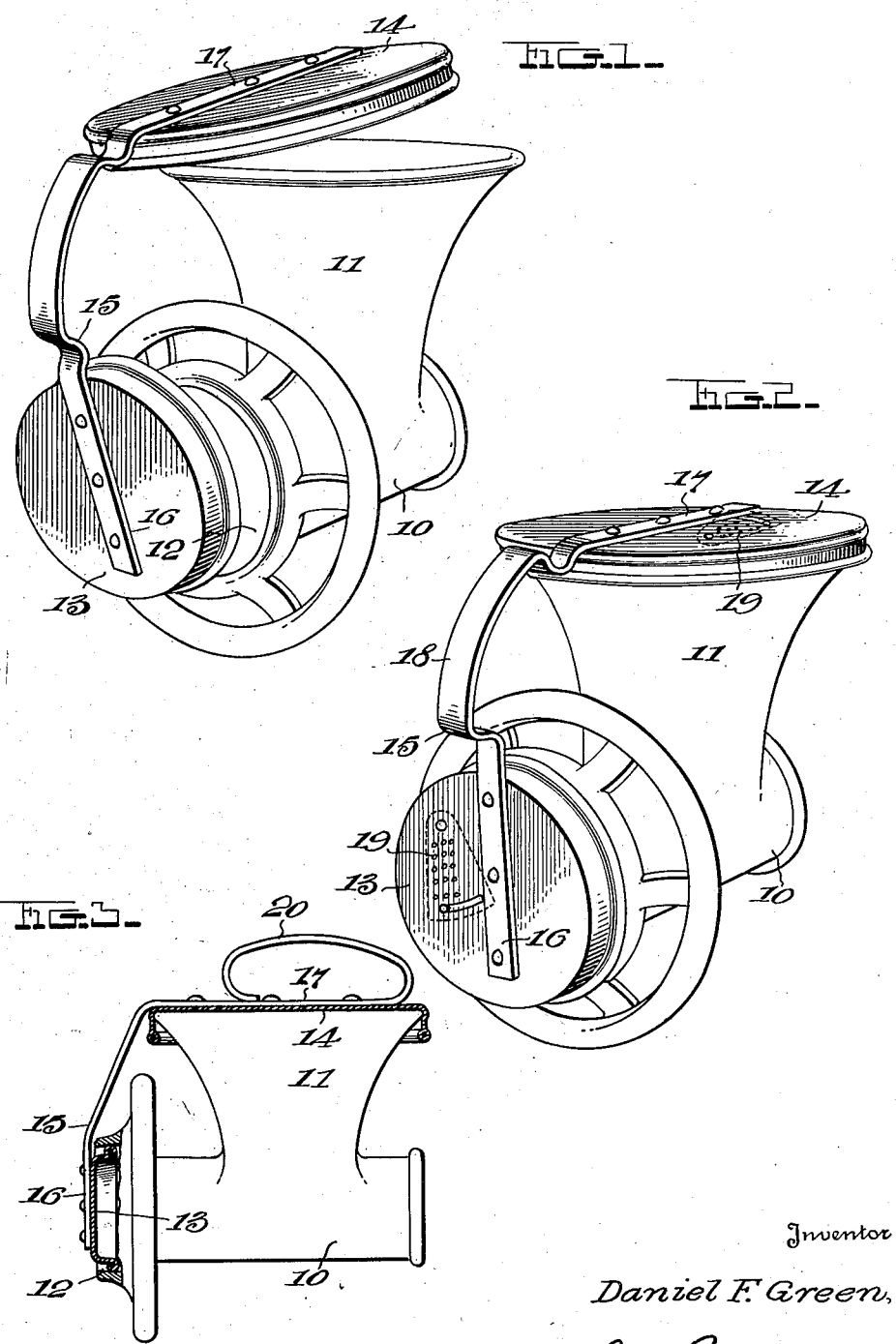
Inventor
Daniel F. Green,
By
Attorney Patented July 20, 1937

2,087,474

UNITED STATES PATENT OFFICE 2,087,474

COVER FOR MEAT GRINDERS

Daniel F. Green, Portland, Oreg.

Application June 25, 1936, Serial No. 87,297

3 Claims. (Cl. 146—182)

The present invention relates generally to covers for sausage and meat grinders and has for its primary object the provision of a simple, readily placeable and removable cover arrangement for protecting both the receiving hoppers and discharge outlets of such devices in shops and homes against dust, dirt, insects and other contaminating matter during periods of use.

It is well known that if left exposed after use in shops, restaurants, food distributing centers and homes, meat grinders attract flies and other insects and that dust and dirt readily settle in the receiving hoppers to the very great disadvantage of the meat produced at the next operation. On the other hand, where the grinder is frequently used, any cover to be acceptable must be readily and easily set up and removed; otherwise much time is wasted and every incentive presented to avoid its use.

The present cover is easily manipulated, is strong and durable, and will be effective and efficient as will be more thoroughly understood from the following detailed description thereof, referring to the accompanying drawing.

In the drawing, which illustrates the invention and forms a part of this specification, Figure 1 is a perspective view showing portions of a grinder with my improvements ready for application thereto.

Figure 2 is a similar view showing the present cover fully applied; and,

Figure 3 is a side view showing the grinder parts in elevation and the cover members in section, showing certain slight modifications.

Referring now to these figures, I have shown the body 10 of a grinder which may be a sausage grinder or one for meats in general and which has an upwardly opening receiving hopper 11 adjacent to one end thereto and a forwardly and horizontally opening discharge mouth 12 adjacent to its opposite end which may have an external or an internal cutter (not shown) depending upon its particular type.

Irrespective of the question of cutters, the discharge mouth 12 will be effectively closed, according to my invention, by a flanged cover member 13 of circular shape, and in practice as in Figures 1 and 2 this member 13 may be rather deeply flanged to fit over external cutters which extend rather beyond the mouth 12, or may be formed to extend within the discharge mouth as seen in Figure 3, to accord with different types of grinders.

A somewhat similar, though substantially larger cover member 14 is provided for the hopper 11, and the flange of this member in applied position completely covers the upper rim of the hopper for a purpose which will presently appear.

It is obvious that, as applied, the two cover members 13 and 14, extend substantially at right angles to one another, and the invention provides a connection between the two members whereby they are placed under slight tension in this relation, so as to tend to hold the same against accidental unseating in the applied position.

The connection above referred to is in the nature of a connecting bar 15, of generally right-angular form, one end 16 being rigidly connected, as by spot welding, riveting and the like, to cover member 13, and the other end 17 being similarly connected to the member 14. Thus the bar forms a means by which the two cover members may be handled as a unit and this bar has a limited resilience such as will permit yielding movement of one cover member with respect to the other and enable variation of their angular relationship so as to permit of their ready application to, and removal from, effective position as shown in Figure 2.

It is preferable, for the above purpose, that the connecting bar 15 be bent or offset intermediate its ends, and between the two cover members, to form a handle 18 which will permit the operator to easily flex the bar and in this way readily apply and remove the cover unit with the use of but one hand.

Obviously, a cover unit such as thus proposed has no particular station or position when not in use and is readily portable with the grinder, and it is equally plain its construction will promote long life, lasting effectiveness and limit expense to its first cost.

The hopper cover 14 may of course be made in various shapes to fit hoppers of different shapes, and it, as well as the cover 13, may, as seen in Figure 2, have small perforations at 19 normally closed by inner plates slidable or swingable to uncover the perforations and provides for the circulation of air through the cover members to purify and prevent fermentation of material within the grinder.

It is also obvious that instead of an intermediate handle portion 18, the connecting bar may, as in Figure 3, have a reverting, curved end extension 20 forming a handle directly above the hopper cover member 14. If desired, the connecting bar 15 may be in adjustable sections where necessary to accommodate the same to grinders of different sizes.

What is claimed is:

1. A cover for meat grinders and the like having a feed hopper and discharge outlet, said cover consisting of a pair of rigid cover members in spaced apart approximately right angular relationship, and a connecting handle bar extending between, and rigidly connected at its ends to said members for forming therewith a freely portable cover unit each part of which is permanently united in place, each of said members having means to maintain itself in covering position against lateral displacement when axially pressed into such engagement, and the said bar having a resilience exerting axial pressure against each member in the engaged position and forming a handle between the members facilitating the springing of one member into engaged position by manual flexure of the handle after manual application of the other member in its engaged position.

2. A cover for meat grinders and the like having a feed hopper and discharge outlet, said cover consisting of a pair of rigid cover members in spaced apart approximately right angular relationship, and a connecting handle bar extending between, and rigidly connected at its ends to said members for forming therewith a freely portable cover unit each part of which is permanently united in place, each of said members having means to maintain itself in covering position against lateral displacement when axially pressed into such engagement, and the said bar having a resilience exerting axial pressure against each member in the engaged position and having an offset handle portion between the members facilitating its manual flexure when springing the members into, and out of, engaged position.

3. A cover for meat grinders and the like having a feed hopper and discharge outlet, said cover consisting of a pair of rigid cover members in spaced apart approximately right angular relationship, and a connecting handle bar extending between, and rigidly connected at its ends to said members for forming therewith a freely portable cover unit each part of which is permanently united in place, each of said members having means to maintain itself in covering position against lateral displacement when axially pressed into such engagement, the said bar having a resilience exerting axial pressure against each member in the engaged position and forming a handle between the members facilitating the springing of one member into engaged position by manual flexure of the handle after manual application of the other member in its engaged position, and adjustable means carried by each of said members providing for the passage of air therethrough to ventilate a grinder and the like covered by the said members in their engaged positions.

DANIEL F. GREEN.